(12) United States Patent
Yeh et al.

(10) Patent No.: US 6,333,628 B1
(45) Date of Patent: Dec. 25, 2001

(54) LINEAR MOTION ROLLING GUIDE UNIT WITH DETECTION DEVICE

(75) Inventors: Chi-Wen Yeh, Tai-Chung; Ching-Shan Wu, Tung-Shiau Jen, both of (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 09/406,809

(22) Filed: Sep. 28, 1999

(30) Foreign Application Priority Data

Mar. 5, 1999 (TW) ................................................ 88203319

(51) Int. Cl.[7] ............................... G01B 7/00; G01B 7/14; F16C 29/04; H02K 41/02
(52) U.S. Cl. ............................... 324/207.24; 324/207.15; 324/207.22; 310/12; 318/135
(58) Field of Search .................... 324/207.15, 207.16, 324/207.22, 207.24; 310/12, 68 B; 318/135; 384/43, 44

(56) References Cited

U.S. PATENT DOCUMENTS 5,606,256 * 2/1997 Takei ........................... 324/207.24 X
5,945,824 * 8/1999 Obara et al. ................. 324/207.24 X

* cited by examiner

Primary Examiner—Gerard R. Strecker
(74) Attorney, Agent, or Firm—Dougherty & Troxell

(57) ABSTRACT

A linear guide apparatus with magnetic distance sensor is disclosed. A magnetic tape is adhered right on the upper surface of the guide rail so as to minimize the variation of distance between the magnetic tape and a magnetic induction element to assure high distance sensing sensitivity when the slide block is exerted by a transverse thrust force. The magnetic tape can be adhered to the upper surface of the guide rail after the guide rail has been assembled to its base thereby facilitating the assembly work. The magnetic induction element is installed in an end cap of the slide block so that it is not necessary to modify the construction of the inner part of the slide block. As a result, the space is saved and the mechanical strength of the apparatus is increased. In order to reduce the influence of magnetic field induced by the electric current flowing in the power supply lines of the apparatus on the sensor signal, an outlet terminal block is provided on a side surface of the slide block so as to prevent the signal wires from passing through right over the magnetic tape thereby protecting the sensor signal from interference.

2 Claims, 4 Drawing Sheets

LINEAR MOTION ROLLING GUIDE UNIT WITH DETECTION DEVICE

BACKGROUND OF THE INVENTION

1. Field of the invention

The present invention relates to a linear guide apparatus with magnetic distance sensor, and more particularly, to a linear guide apparatus with magnetic distance sensor which can save available space in the linear guide apparatus and thereby minimizing manufacturing cost.

2. Description of the Prior Art

Generally speaking, an industrial linear guide apparatus has low friction characteristic but without having any distance sensing function by magnetic induction. If the location of the slide block on the guide rail is desired to be under control from time to time, a gauge acted by a magnetic sensor or an optical sensor is attached to the apparatus which results in both increasing manufacturing cost and causing inconveniency in operation of the apparatus.

In order to eliminate such shortcomings, there were disclosed some new designs of linear guide apparatus with function of locating the position of the slide block on the linear guide apparatus.

One of such conventional linear guide apparatus with magnetic induction distance sensor is shown in FIG. 4. In this cross sectional drawing it is observed that a magnetic tape 3 is adhered on the upper surface of a rail 1. A chamber 21 for accommodating a magnetic induction element 4 is formed in a part of a slide block 2. Incidentally, the manufacturing cost will be increased and the strength of the slide block's structure will be lowered by forming a chamber 21 therein. In addition, when a concentrated downward load is applied to the slide body 2 causing the upper portion of the slide block 2 to bend down by a bending force, the point contact force (if using rolling balls), or line contact force (if using rolling cylinders) between the slide block 2 and the rail 1 will be loosened by a slight relative displacement of contact portion therebetween. Consequently the strength of the whole linear guide apparatus in transverse direction will be reduced and positioning accuracy for the location of the slide block 2 will also be degraded. In the linear guide apparatus shown in FIG. 4, since the tightening screw bolt for fixing the rail 1 is applied downwardly, the rail 1 has to be made into flatter and wider configuration so as to prevent the magnetic tape 3 from standing in the way of tightening screw bolt hole 11 for fixing the rail 1.

A second type conventional linear guide apparatus with magnetic induction distance sensor is shown in FIG. 5. In this cross sectional drawing it is observed that since the tightening screw bolt for fixing the rail 1 is upwardly installed, therefore the rail 1 is made into normal configuration.

FIGS. 6 and 7 show drawings of a third type conventional linear guide apparatus with magnetic induction distance sensor, FIG. 6 shows its front view while FIG. 7 shows a cross sectional view along line I—I of FIG. 6 respectively. In this conventional linear guide apparatus the magnetic tape 3 is adhered on one of the side surface of the rail 1, the rail 1 is mounted on the base after attaching the tape 3 in order to facilitate the assembly work, but it is inevitable that the tape 3 is prone to be hurt during the assembly work. When the slide block 2 displaces in the transverse direction by a force in the same direction. The variation of the distance between the magnetic tape 3 and the magnetic induction element 4 will be greater than that in the case when the magnetic tape 3 is adhered right on the rail surface therefore affecting sensor's sensitivity. In this linear guide apparatus an induction element chamber 83 with an induction element therein is formed on a base 8 which is mounted on an end case 5. Signal wires 7 are laid in a trough 84 A plurality of through holes 82 are provided for tightening screws 83 to fix the end cap s. An outlet terminal block 81 is for connecting and securing signal wires 7. Slid e block fixing holes 22 are provided for the guide rail 1 and slide block 2. A wiper 9 is attached to the end cap 5 and oil nipple 91 supplies oil to the device.

SUMMARY OF THE INVENTION

The present invention has been made in order to eliminate the inconvenience inherent to the conventional technique as mentioned above. According to the present invention, a magnetic tape is adhered right on the upper rail surface so as to minimize the variation of distance between the magnetic tape and the magnetic induction element to assure high distance sensing sensitivity when the slide block is exerted by a thrust force in the transverse direction. The magnetic tape is adhered to the upper surface of the guide rail after the rail has been assembled to its base thereby facilitating the assembly work. The magnetic induction element is installed in an end cap of the slide block so that it is not necessary to form a chamber within the slide block to accommodate the magnetic induction element. In this way the space in the linear guide apparatus is saved and its mechanical strength is enhanced. In order to reduce the influence of the magnetic field generated by the electric current flowing in the proper supplying lines of the guide apparatus, an outlet terminal block is provided on a side surface of the slide block so as to prevent the signal wires from passing right over the magnetic tape and protect the sensor signal from interference.

BRIEF DESCRIPTION OF THE DRAWINGS

The drawings disclose illustrative embodiments of the present invention which serve to exemplify the various advantages and objects hereof, and are as follows.

DETAILED DESCRIPTION OF THE PREFERRED EMBODIMENT

Figure 1:
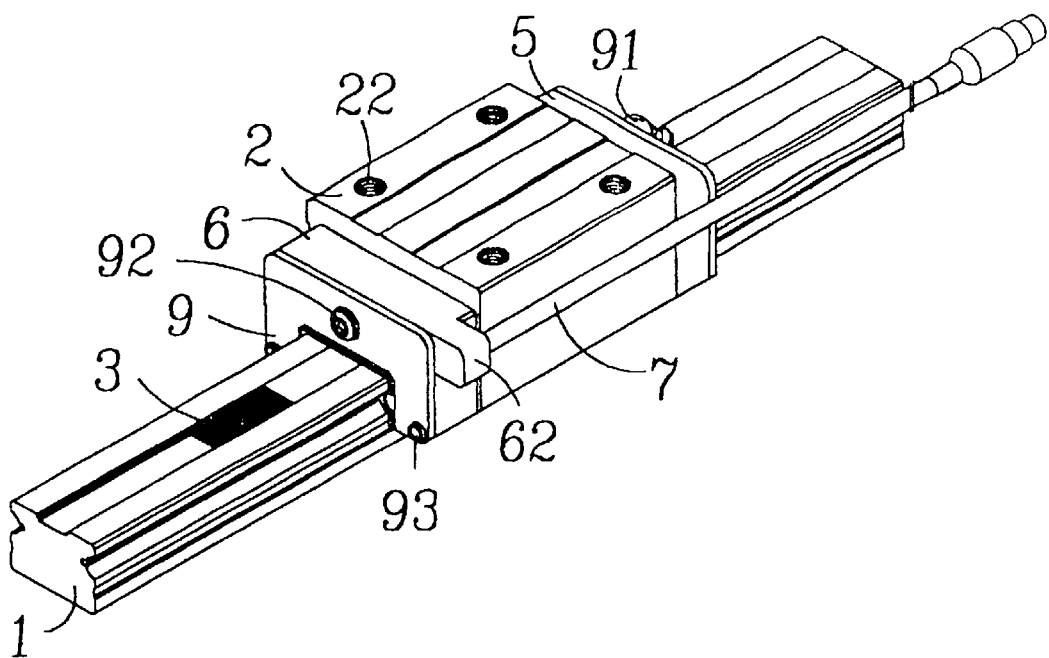
FIG. 1 is a three dimensional drawing of the linear guide apparatus with magnetic distance sensor of the present invention.
Figure 2:
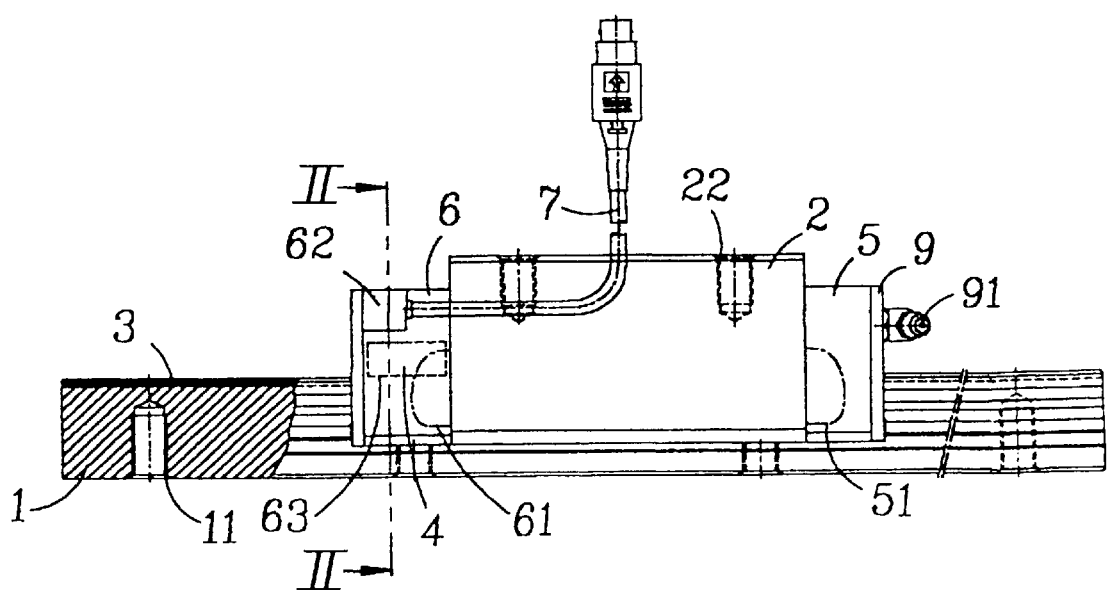
FIG. 2 is the front view of the linear guide apparatus with magnetic distance sensor of the present invention.
Figure 3:
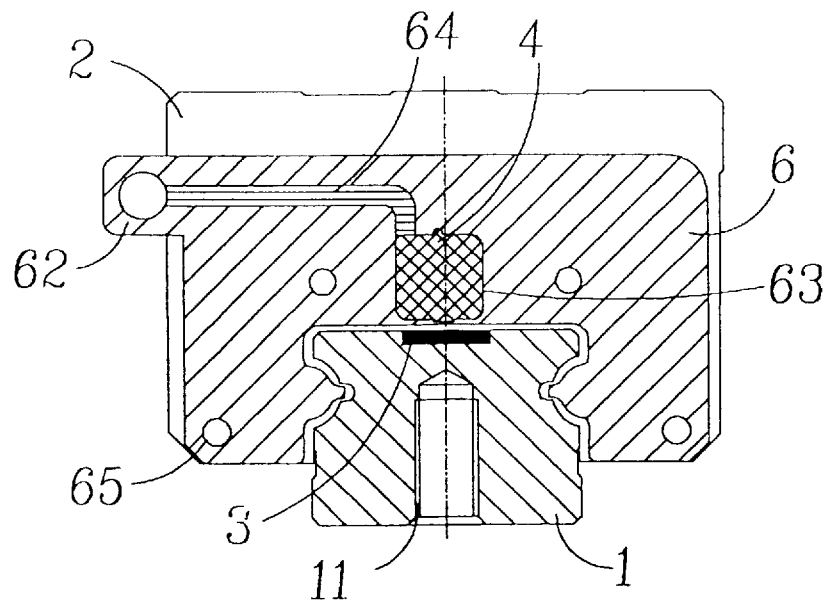
FIG. 3 is the cross sectional view of the present invention cut alone line II—II on FIG. 2.
Figure 4:
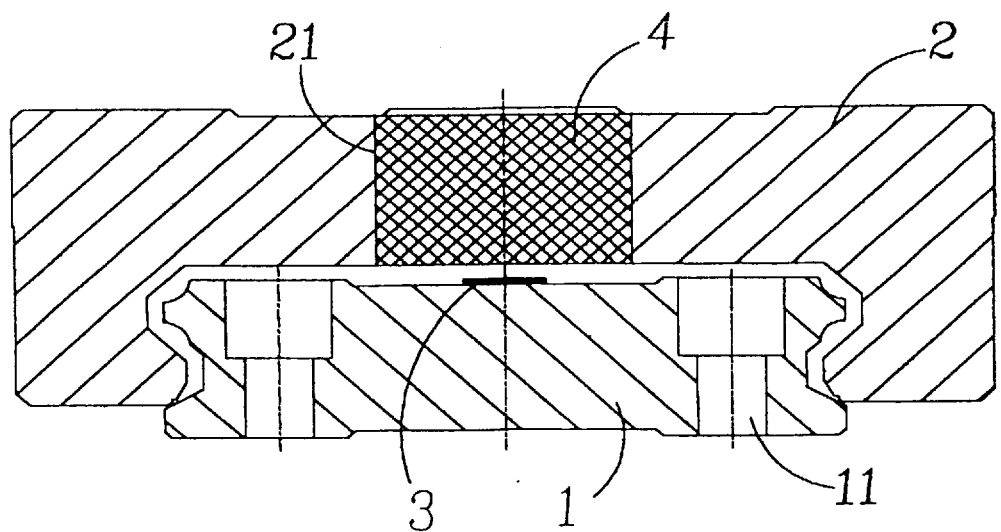
FIG. 4 is the cross sectional view of a first conventional linear guide apparatus with magnetic distance sensor.
Figure 5:
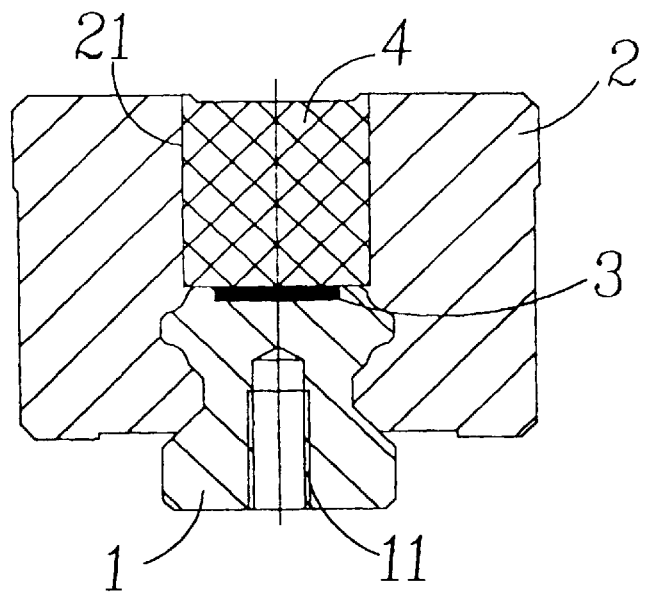
FIG. 5 is the cross sectional view of a second conventional linear guide apparatus with magnetic distance sensor.
Figure 6:
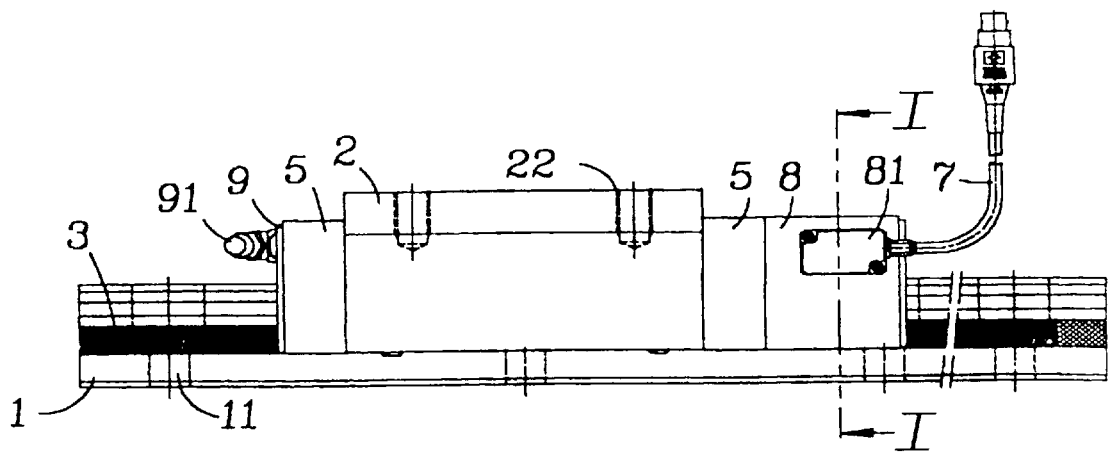
FIG. 6 is the front view of a third conventional linear guide apparatus with magnetic distance sensor.
Figure 7:
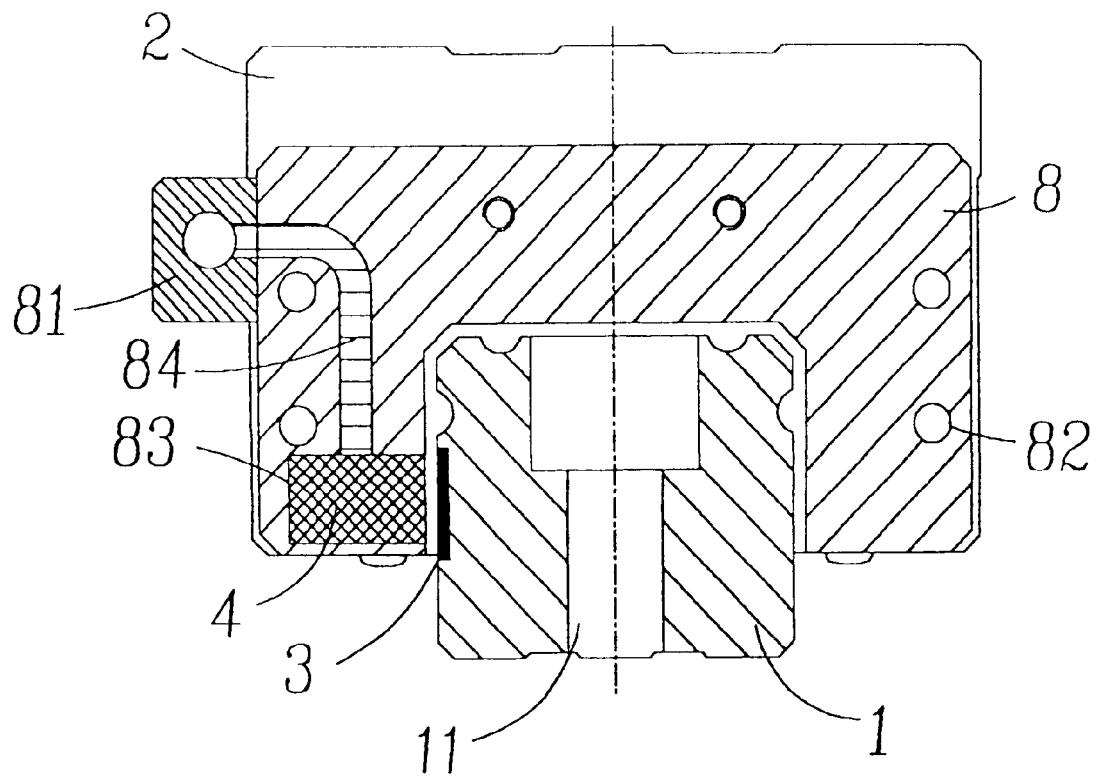
FIG. 7 is the cross sectional view of a third conventional linear guide apparatus with magnetic distance senor of FIG. 6 cut along line I—I.

The drawings of the linear guide apparatus with magnetic distance sensor of the present invention are shown in FIGS. 1 to 3. The magnetic tape 3 is just right on the upper surface of a guide rail 1. One can adhere the magnetic tape 3 after the guide rail 1 has been assembled to the linear guide apparatus, so that the working process is very convenient. Since the magnetic tape 3 is adhered right on the upper surface of the guide rail 1, the longitudinal direction of the guide rail 1 pass through the transverse turning center of the slide block 2. And from the drawings, we can find the distance between the magnetic induction element 4 and the transverse turning center of the slide block 2 is small. As a result, when the slide block 2 turns a small angle with respect to its center in the transverse direction by a transverse turning moment, the deviation of normal distance between the magnetic tape 3 and the magnetic induction element mounted on the slide block 2 is negligible. So that the accuracy of distance sensing is not affected.

In FIG. 2, a general end cap 5 is attached to the right end of the slide body 2, and in the end cap 5, there is formed a direction changing passage for rolling elements 51, whereas another end cap 6 is attached to the left end of the slide body 2 in which in addition to another direction changing passage for rolling elements 61, there is provided an induction element chamber 63 to accommodate a magnetic induction element 4 therein. For the purpose of terminating and securing signal wires 7, an outlet terminal block 62 is formed on the left end cap 6. Since the magnetic induction element 4 is accommodated in the left end cap 6, it is not necessary to make any additional modification to the slide block 2 so that the production cost is reduced and space is saved. Moreover, the mechanical strength of the slide block 2 is increased. Guide rail fixing holes II and slide block fixing holes 22 are provided for the guide rail 1 and slide block 2 respectively to make assembly work. A wiper 9 is attached to each of the end caps 5 and 6 for scraping the dust spreading on the guide rail 1. An oil nipple 91 and an oil packing 92 shown in FIG. 1 are for supplying oil and preventing oil leakage respectively. End cap fixing screws 93 are for securing the end caps 5 and 6 to the slide block 2 through screw holes 65.

In order to minimize the effect of a magnetic field induced by the current flowing in the electric power line to the behavior of the magnetic tape 3, an outlet terminal block 62 is provided on the side surface of the end cap 6 so as to avoid possible interference to the sensor signals should the signal wires 7 pass right over the magnetic tape 3 (see FIG. 3 ). Incidentally, a trough 64 is provided for laying the signal wires 7.

A cost and space saving, easily manufacturable, and accurately distance sensing linear guide apparatus with magnetic distance sensor of the present invention is constructed as such.

Many changes and modifications in the above described embodiment of the present invention can, of course, be carried out without departing from the scope thereof. Accordingly, to promote the progress in science and the useful arts the invention is disclosed and is intended to be limited only by the scope of the appended claims.

What is claimed is:

1. A linear motion rolling guide unit with a magnetic distance sensor comprising an elongated guide rail having a top surface and extending in a lengthwise direction, a slide body for movement along said elongated guide rail, said slide body having two opposite ends and two side surfaces extending along said slide body between said two opposite ends, said slide body including two end caps with one of said end caps disposed at each of said opposite ends, a plurality of rolling elements interlaid between said slide block and said guide rail for supporting said slide block on said guide rail as it moves therealong and each of said two end caps including a direction changing passage for recirculating said rolling elements, a magnetic tape adhered to the top surface of said guide rail and under said slide block whereby said slide block is adapted to slide over said magnetic tape, an induction element chamber formed in one of said end caps facing said magnetic tape on said guide rail as said slide body passes over said magnetic tape, and a magnetic induction element disposed within said induction chamber, signal wires and an outlet terminal block provided on one of said end caps and extending outwardly from one of said side surfaces of said slide body for receiving one end of said signal wires, a longitudinal trough extending in a lengthwise direction in one of said side surfaces of said slide body for receiving said signal wires so that said signal wires do not pass over said magnetic tape as said slide body is moved along said guide rail to indicate the distance said slide body is move along said guide rail.

2. A linear motion rolling guide unit with a magnetic distance sensor according to claim 1, wherein said rolling elements are balls.

* * * * *